(12) United States Patent
Guntupalli et al.

(10) Patent No.: US 9,686,398 B2
(45) Date of Patent: Jun. 20, 2017

(54) PROMPT BASED ALERT BY A USER DEVICE IN SILENT MODE

(71) Applicant: Verizon Patent and Licensing Inc., Arlington, VA (US)

(72) Inventors: Neelima Guntupalli, Guntur (IN); Ramanjanyulu Challapalli, Hyderabad (IN); Sridhar Kaki, Hyderabad (IN); Amulya Tellabati, Visakhapatnam (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/943,237

(22) Filed: Nov. 17, 2015

(65) Prior Publication Data

US 2017/0142250 A1 May 18, 2017

(51) Int. Cl.
*H04W 4/02* (2009.01)
*H04M 1/725* (2006.01)

(52) U.S. Cl.
CPC .............................. *H04M 1/72563* (2013.01)

(58) Field of Classification Search
CPC ....................................................... H04M 1/72
USPC .............................................. 455/414.1–419
See application file for complete search history.

(56) References Cited

U.S. PATENT DOCUMENTS

| | | | |
|---|---|---|---|
| 2008/0132290 A1* | 6/2008 | Sharabi ............. | H04M 1/72519 455/567 |
| 2008/0207263 A1* | 8/2008 | May .................. | H04M 1/72566 455/556.2 |
| 2009/0233589 A1* | 9/2009 | Zohar ................ | H04M 1/72522 455/418 |
| 2013/0230190 A1* | 9/2013 | Chen ...................... | H03G 5/165 381/103 |

* cited by examiner

*Primary Examiner* — Michael T Vu (57) ABSTRACT

A user device may receive information identifying a prompt and an alert to be provided, when the user device is in a silent mode, based on the prompt. The user device may receive a message including the prompt when the user device is in the silent mode, and may detect the prompt in the body of text associated with the message. The user device may provide the alert based on detecting the prompt in the body of text associated with the message despite the user device being in the silent mode.

20 Claims, 6 Drawing Sheets

PROMPT BASED ALERT BY A USER DEVICE IN SILENT MODE

BACKGROUND

Based on receiving a communication, such as a call or a text message, a user device may notify a user of the communication by providing an audible notification, a mechanical notification, and/or a visual notification. The user may disable and/or reduce the capability of the user device to notify the user when the user is located in a quiet environment and/or does not wish to be notified.

DETAILED DESCRIPTION OF PREFERRED EMBODIMENTS

The following detailed description of example implementations refers to the accompanying drawings. The same reference numbers in different drawings may identify the same or similar elements.

A user of a user device, such as a smart phone, may misplace the user device. In some instances, the user may locate the user device by calling the user device from another device and locating the user device based on an audible notification (e.g., a ringtone). However, if the user device has audible notifications disabled (e.g., a notification profile is set to silent mode), then such a technique may not prove effective. Implementations described herein may allow a user device to provide an alert during instances when notifications are disabled, thereby overriding the silent mode on the user device. This allows a user to more readily locate the user device.

Figure 1A:
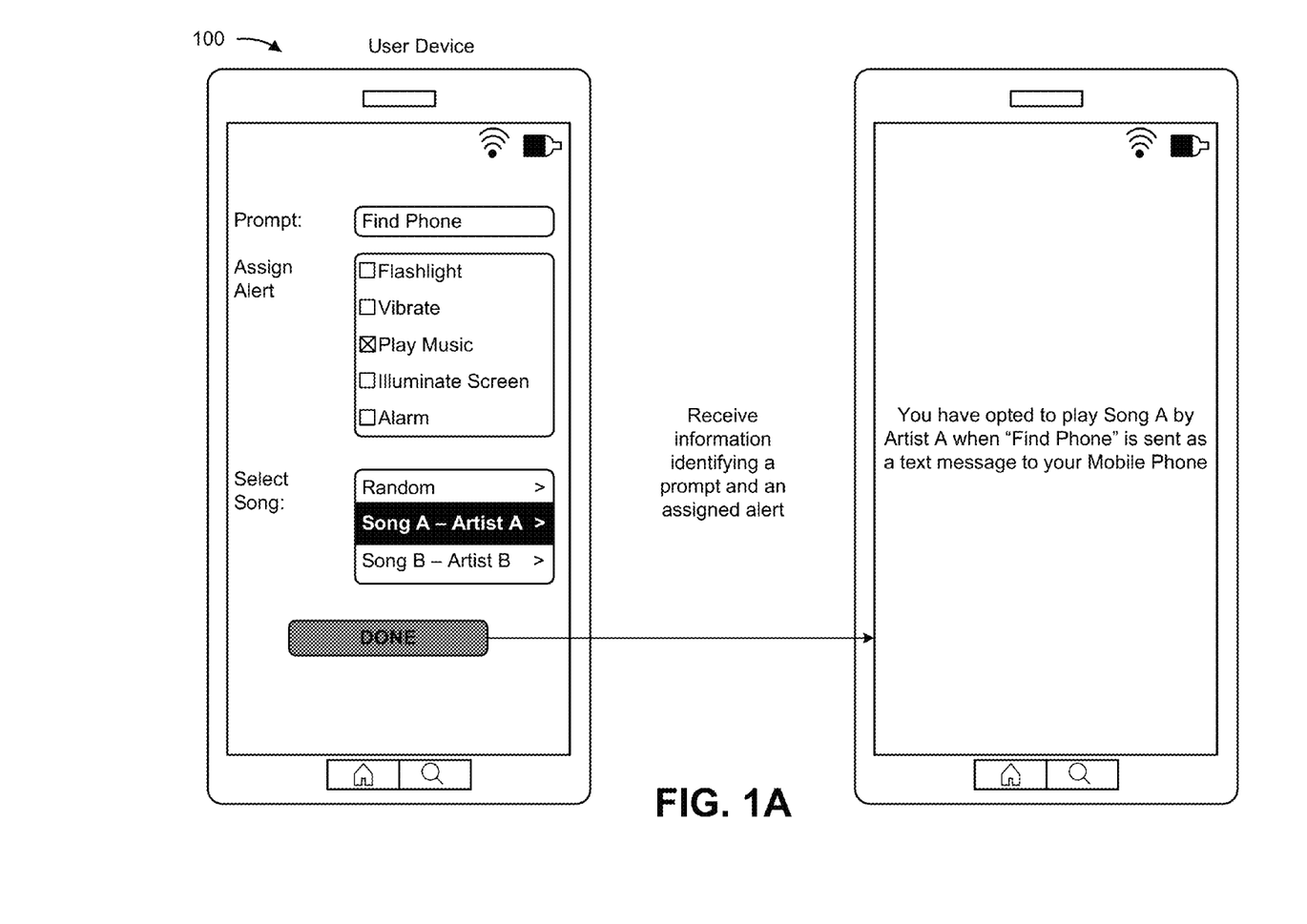
FIGS. 1A-1C are diagrams of an overview of an example implementation described herein.
Figure 1B:
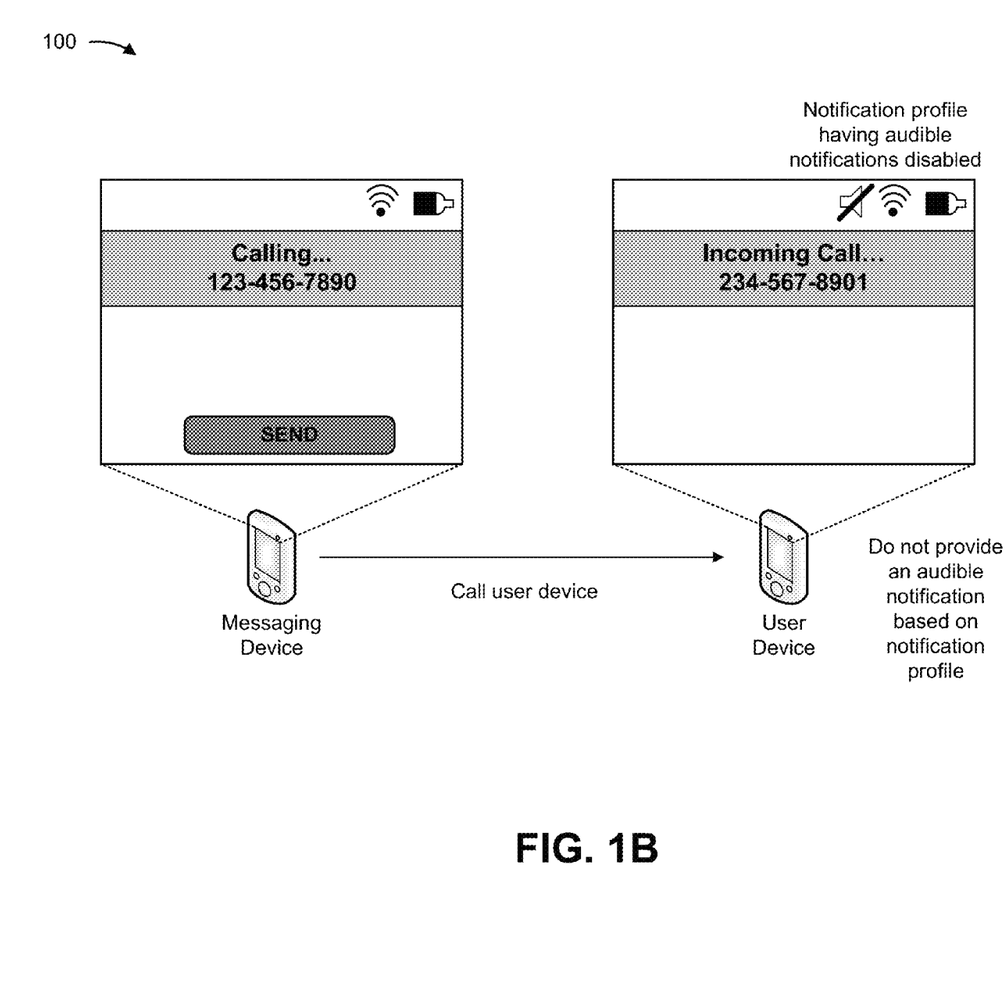
Figure 1C:
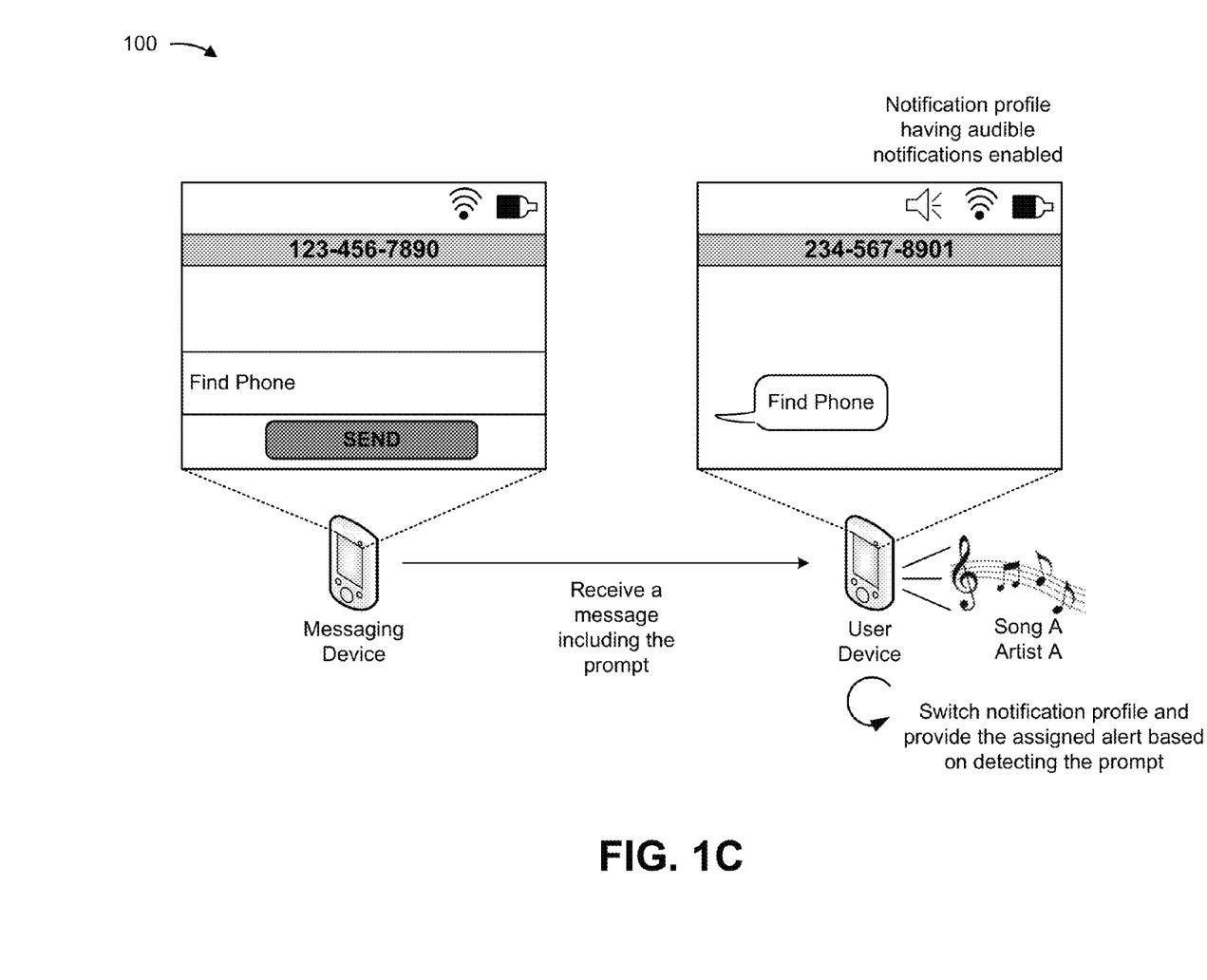

FIGS. 1A-1C are diagrams of an overview of an example implementation 100 described herein. As shown in FIG. 1A, example implementation 100 may include a user device, such as a smart phone, including a user interface. The user interface may include a text field allowing a user to enter a prompt. As shown, assume that the user enters the prompt "Find Phone." A prompt may include text, such as a word, a phrase, or the like, that when detected in a received message (e.g., in a text body of a short message service (SMS) message) may cause the user device to provide an alert. An alert may include a function associated with an output component of the user device (e.g., may include playing an audio file, activating a light emitting diode (LED), etc.).

As shown, the user interface of the user device may provide a list of alerts that the user may assign to the prompt. As further shown, assume that the user selects "play music" as the alert to be provided based on the prompt. The user device may display a list of audio files (e.g., from a music library associated with the user device) based on the user selecting "play music" as an alert. As further shown, assume that the user selects a particular song (e.g., "Song A"). The user device may store the prompt and the alert.

As shown in FIG. 1B, a messaging device may call the user device. For example, assume that the user of the user device has misplaced the user device. The user, or another user, may call the user device in an attempt to locate the user device (e.g., determine a location of the user device based on an audible notification). However, as shown, assume that the user device is set to a notification profile having audible notifications disabled (e.g., a silent mode). Based on the notification profile, the user device may not provide an audible notification.

As shown in FIG. 1C, the messaging device may send a message (e.g., an SMS message) to the user device that includes the prompt. The user, or another user, may send a message including the prompt to the user device in an effort to locate the user device. For example, as shown, the prompt (e.g., "Find Phone") may be entered in a text field associated with a user interface of the messaging device. The user device may receive the message, including the prompt, from the messaging device and may detect the prompt in the text body of the message. Based on detecting the prompt in the text body of the message, the user device may switch from a first notification profile (e.g., audible notifications disabled) to a second notification profile (e.g., audible notifications enabled). Additionally, or alternatively, the user device may provide the alert based on detecting the prompt, thereby overriding a notification profile (e.g., silent mode). For example, as shown, the user device may play the assigned song based on detecting the prompt in the text body of the message. Implementations described herein may assist a user in locating a misplaced user device when the user device has notifications disabled. Implementations described herein may conserve processor, memory, battery, and/or network resources by reducing the time and/or quantity of calls needed to locate a misplaced user device when the user device has notifications disabled.

As indicated above, FIGS. 1A-1C are provided merely as an example. Other examples are possible and may differ from what was described with regard to FIGS. 1A-1C.

Figure 2:
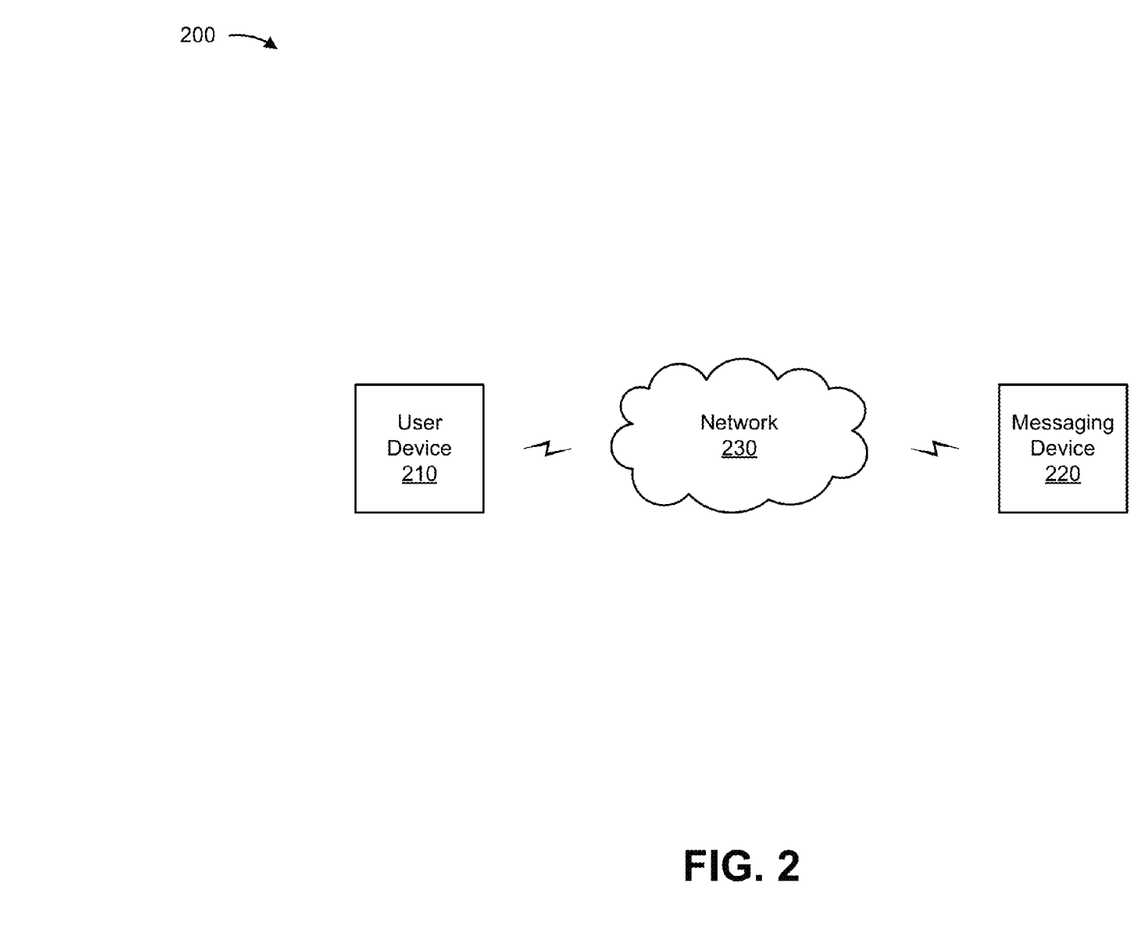
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include user device 210, messaging device 220, and network 230. Devices of environment 200 may interconnect via wired connections, wireless connections, or a combination of wired and wireless connections.

User device 210 and/or messaging device 220 may include one or more devices capable of receiving, generating, storing, processing, and/or providing information associated with a prompt and/or an alert. Further, user device 210 and/or messaging device 220 may include one or more devices capable of sending and/or receiving text based messages (e.g., SMS messages, multimedia messaging service (MMS) messages, email messages, or the like) and/or capable of participating in a call (e.g., a voice call, a video call, etc.). For example, user device 210 and/or messaging device 220 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, user device 210 may include one or more sensors (e.g., a photodiode, a camera, a microphone, etc.) that permit user device 210 to receive input and/or detect environmental conditions. In some implementations, user device 210 and/or messaging device 220 may include one or more notification profiles (e.g., notifications disabled, audible notifications disabled, audible notifications enabled, etc.).

Network 230 may include one or more wired and/or wireless networks. For example, network 230 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
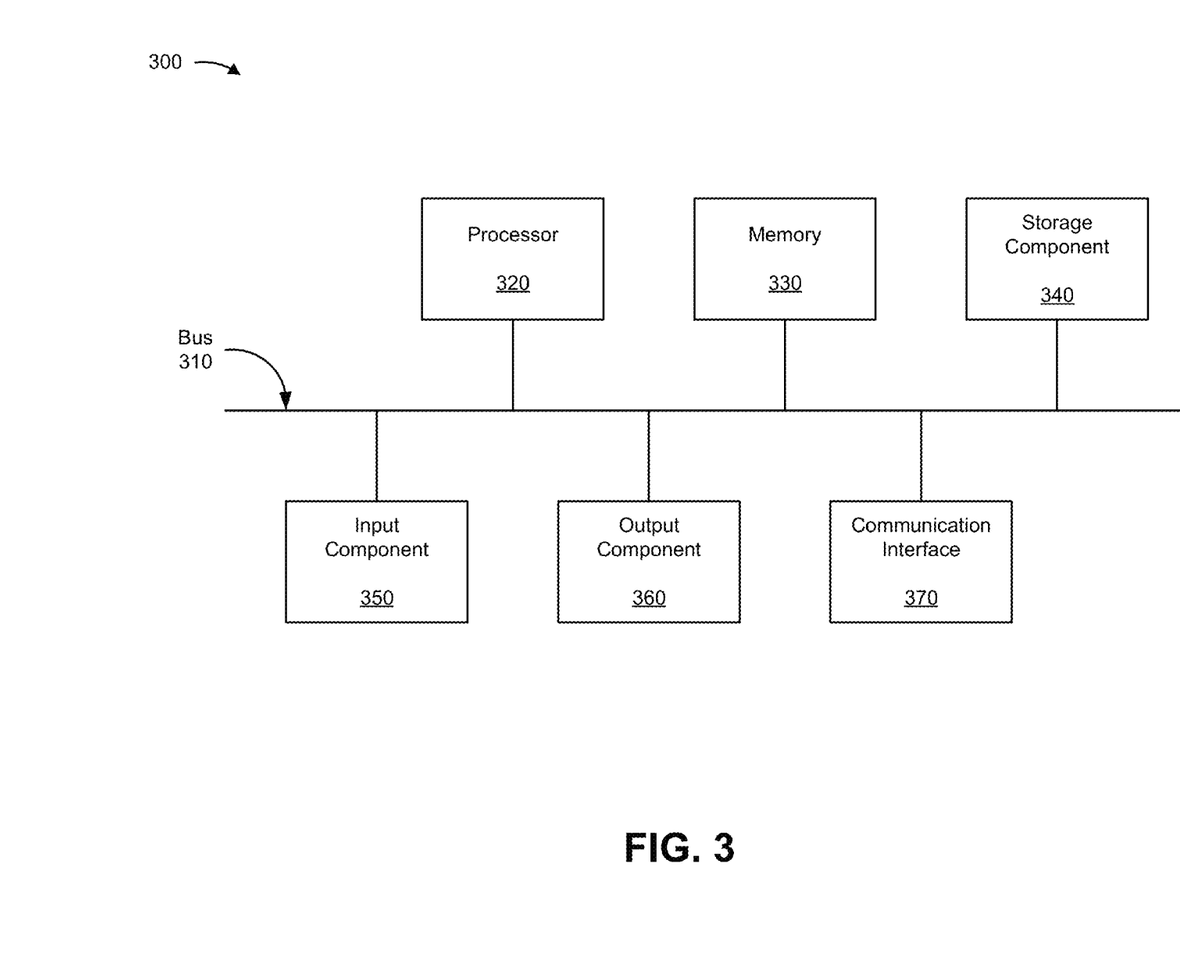
FIG. 3 is a diagram of example components of one or more devices of FIG. 2.

FIG. 3 is a diagram of example components of a device 300. Device 300 may correspond to user device 210 and/or messaging device 220. In some implementations, user device 210 and/or messaging device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, one or more speakers, one or more LEDs, etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
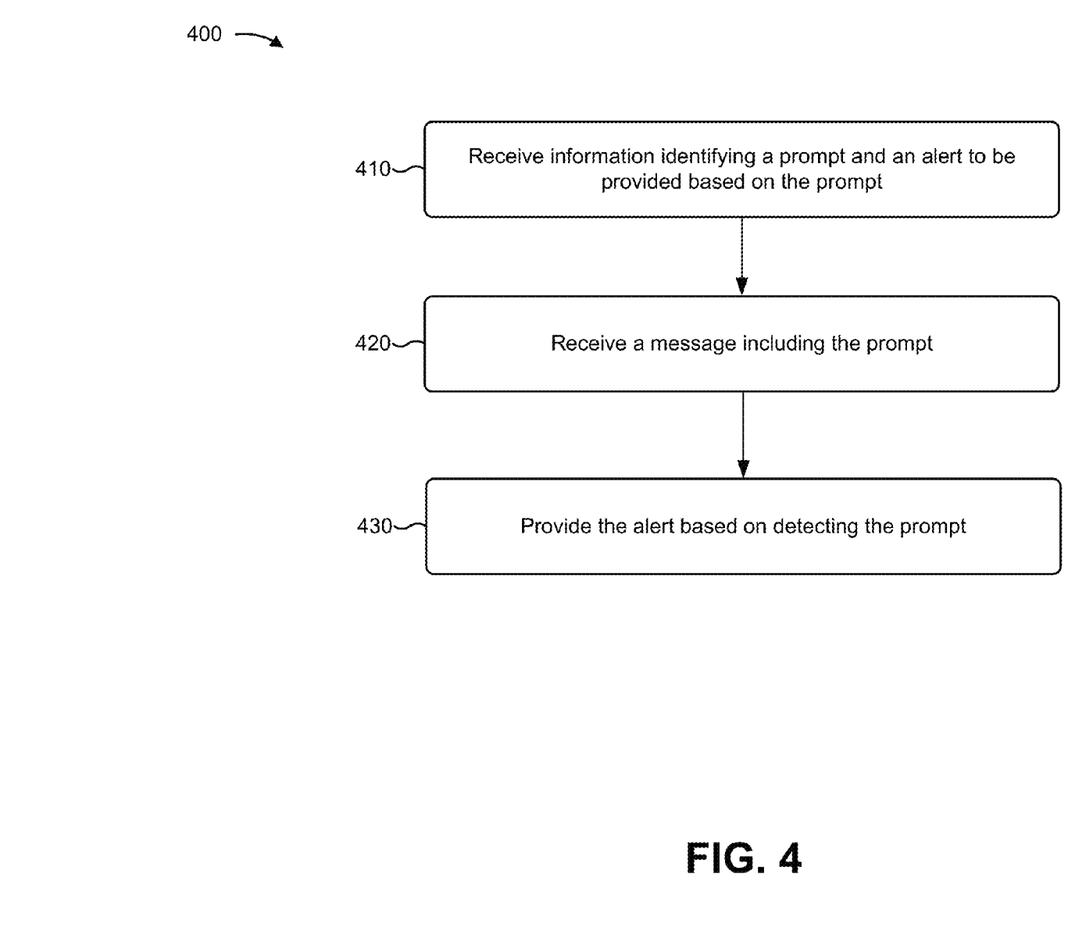
FIG. 4 is a flow chart of an example process for providing an alert, by a user device in silent mode, based on a prompt.

FIG. 4 is a flow chart of an example process 400 for providing an alert, by a user device in silent mode, based on a prompt. In some implementations, one or more process blocks of FIG. 4 may be performed by user device 210. In some implementations, one or more process blocks of FIG. 4 may be performed by another device or a group of devices separate from or including user device 210, such as messaging device 220.

As shown in FIG. 4, process 400 may include receiving information identifying a prompt and an alert to be provided based on the prompt (block 410). For example, user device 210 may receive information identifying a prompt and an alert to be provided based on the prompt. In some implementations, user device 210 may receive the information based on an input (e.g., from a user of user device 210). Additionally, or alternatively, user device 210 may be preconfigured with the information or may receive the information from another device.

A prompt may include text, such as a word, a phrase, a character, a string of characters, a digit, a sequence of digits, a symbol, or the like, in some implementations. For example, a user of user device 210 may input a prompt (e.g., via a text field associated with a user interface of user device 210), in some implementations. Additionally, or alternatively, the user may select a prompt (e.g., via a menu associated with a user interface of user device 210).

An alert may include an audible, visual, and/or mechanical output associated with user device 210, in some implementations. For example, user device 210 may provide an audible alert (e.g., by playing an audio file associated with a song, an alarm tone, a ringtone, etc., by running a music application, or the like). Additionally, or alternatively, user device 210 may provide a visual alert (e.g., by adjusting a brightness of a display, by activating one or more LEDs, by running an application involving an LED, or the like). Additionally, or alternatively, user device 210 may provide a mechanical alert (e.g., by vibrating, by pulsating, or the like).

In some implementations, user device 210 may receive information identifying a prompt and one or more alerts to be provided based on the prompt. For example, a user of user device 210 may input a prompt, and may assign one or more alerts to be provided based on the prompt. For example, assume that a user inputs a prompt "locate." Further, assume that the user assigns a first alert (e.g., for user device 210 to play an audio file) and a second alert (e.g., for user device 210 to activate an LED) to be provided based on the prompt. User device 210 may store the information identifying the prompt and the alert(s) to be provided based on the prompt. In this way, user device 210 may receive a message including the prompt, and may provide one or more alerts based on receiving the message, as described below. In some implementations, user device 210 may store information identifying one or more prompts and one or more corresponding alerts to be provided based on the one or more prompts. In this way, user device 210 may provide multiple and/or different alerts based on receiving messages including the one or more prompts, as described below.

In some implementations, user device 210 may receive information identifying one or more configurations associated with one or more alerts. For example, a user may configure a volume level of an audible alert (e.g., may configure user device 210 to provide the alert at a maximum volume level, an intermediate volume level, a particular volume level, etc.), may configure a brightness level of a visual alert (e.g., a maximum brightness level, a particular brightness level, etc.), or the like. In some implementations, a user may configure a duration of an alert (e.g., may specify how long user device 210 is to provide the alert). In this way, user device 210 may provide an alert based on an assigned configuration, which may allow a user to locate user device 210 (e.g., by providing an alert with a maximum volume level for a long duration of time).

As further shown in FIG. 4, process 400 may include receiving a message including the prompt (block 420). For example, user device 210 may receive a message including the prompt from messaging device 220 and may detect the prompt. In some implementations, messaging device 210 may send a text based message including the prompt to user device (e.g., an SMS message, an MMS message, or the like). For example, the user or another user may input the prompt via a text field associated with messaging device 220, and may send a message including the prompt to user device 210. User device 210 may receive the message and may detect the prompt (e.g., by identifying the prompt in the message body). In this way, user device 210 may receive the message including the prompt, and may provide the alert(s) based on detecting the prompt, as described below.

As further shown in FIG. 4, process 400 may include providing the alert based on detecting the prompt (block 430). For example, user device 210 may provide the alert based on receiving the message from messaging device 220 and detecting the prompt. Based on detecting the prompt, user device 210 may provide the alert associated with the prompt (e.g., a user assigned alert, a configured alert, etc.).

In some implementations, user device 210 may provide the alert based on detecting the prompt in addition to other words, phrases, symbols, etc. in a message body. For example, assume that the prompt is "locate." User device 210 may provide the alert based on receiving a message such as "I cannot locate the car." Additionally, or alternatively, user device 210 may provide the alert based on detecting the prompt in a message body that exclusively includes the prompt. In this way, inadvertent alerts may be avoided by not providing the alert if the message includes additional text.

In some implementations, user device 210 may determine a different alert to provide instead of, or in addition to, the alert (e.g., the assigned alert(s)) based on a detected parameter. For example, user device 210 may determine a different alert (e.g., an unassigned alert and/or another assigned alert) to provide based on a detected volume level and/or an ambient light level in the vicinity of user device 210. In some implementations, if user device 210 determines that a volume level in the vicinity of user device 210 satisfies a threshold (e.g., 80 dB), then user device 210 may provide a visual alert (e.g., by increasing a brightness of the display, by activating an LED, running an application involving an LED, or the like). Additionally, or alternatively, if user device 210 determines that an ambient light level in the vicinity of user device 210 satisfies a threshold (e.g., 1 Lux), then user device 210 may provide a visual alert. In this way, user device 210 may assist a user in locating user device 210 by providing a visual alert rather than, or in addition to, an audible alert when user device 210 is located in a loud and/or dark environment, thereby conserving memory, processor, and/or battery resources.

In some implementations, user device 210 may determine a different alert to provide instead of, or in addition to, the alert based on providing the alert for a threshold amount of time. For example, if user device 210 provides the alert for a threshold amount of time, then user device 210 may provide a different alert in addition to, or instead of, the alert. For example, assume that user device 210 provides the alert (e.g., by activating an LED) for a threshold amount of time. User device 210 may provide a different alert (e.g., by playing an audio file) in addition to, or instead of, providing the alert based on providing the alert for the threshold amount of time. For example, if the user cannot locate user device 210 within a threshold amount of time of user device 210 providing a first type of alert, user device 210 may be configured to provide a second type of alert after, or in addition to, providing the first type of alert (e.g., providing a visual alert after, or in addition to, providing an audible alert, providing an audible alert after, or in addition to, providing a visual alert, or the like). In this way, user device 210 may assist the user in locating user device 210 if the user does not locate user device 210 within a threshold amount of time, thereby conserving memory, processor, and/or battery resources.

In some implementations, user device 210 may deactivate the alert based on providing the alert for a threshold amount of time. For example, if user device 210 determines that a threshold amount of time has elapsed since user device 210 started providing the alert, then user device 210 may cease to provide the alert. In this way, user device 210 may conserve battery resources when a user may not be nearby and/or may be having difficulty locating user device 210. Further, the user may initiate another alert (e.g., the same alert and/or a different alert) by sending another prompt to user device 210.

In some implementations, user device 210 may determine a different alert to provide when user device 210 is connected to a peripheral device (e.g., headphones, a headset, an ear piece, a speaker, a microphone, etc.). For example, user device 210 may determine that a peripheral device is connected to user device 210 (e.g., via an auxiliary port, via Bluetooth, etc.), and may determine a different alert to provide. In this way, if the alert (e.g., the assigned alert) is an audible alert, user device 210 may provide a different alert (e.g., by activating an LED) because the audible alert may not be effective (e.g., may play through a connected peripheral device). In some implementations, if user device 210 determines that a peripheral device is connected to user device 210, then user device 210 may provide an audible alert via a different output component associated with user device 210 (e.g., via a different speaker).

In some implementations, user device 210 may override a setting of user device 210 when providing the alert. Assume that user device 210 is set to a first notification profile (e.g., silent mode). User device 210 may override the setting and may provide the alert based on detecting the prompt. For example, user device 210 may override a silent mode to provide the alert based on detecting the prompt. In this way, user device 210 may remain in the first notification profile (e.g., silent mode) while user device 210 provides the alert, and may remain in the first notification profile after user device 210 has provided the alert.

In some implementations, user device 210 may switch from a first notification profile to a second notification profile based on detecting the prompt, and may provide the alert based on switching notification profiles. A notification profile may include a setting of user device 210 that corresponds to the ability of user device 210 to provide an audible, visual, and/or mechanical notification. For example, a notification profile may disable all notifications (e.g., audible, visual, and mechanical notifications), may enable some notifications (e.g., mechanical notifications), may enable all notifications, or the like. Further, a first notification profile may enable audible notifications at a first volume level, and a second notification profile may enable audible notifications at a second volume level (e.g., louder than the first notification profile).

In some implementations, user device 210 may switch from a first notification profile to a second notification profile based on detecting the prompt, and may provide the alert based on switching notification profiles. In some implementations, the first notification profile may include a setting having all notifications disabled. Additionally, or alternatively, the first notification profile may include a setting having some notifications enabled at a first output level (e.g., volume, brightness, or the like). In some implementations, the second notification profile may include a setting having some notifications enabled (e.g., audible notifications). Additionally, or alternatively, the second notification profile may include a setting having all notifications enabled. Additionally, or alternatively, the second notification profile may include a setting having some notifications enabled at a second output level (e.g., volume, brightness, or the like) that is greater than the first output level (e.g., louder than the first output level). In some implementations, user device 210 may switch from the second notification profile to the first notification profile (e.g., the notification profile that user device was in prior to detecting the prompt), based on providing the alert (e.g., after providing the alert).

In some implementations, user device 210 may switch from a first notification profile to a second profile based on detecting the prompt, and may not provide an alert. For example, a user may input a preference that user device 210 switch from a first notification profile (e.g., silent mode) to a second notification profile (e.g., normal mode) based on detecting the prompt. In this way, user device 210 may switch notification profiles based on detecting the prompt. The user may then initiate a communication (e.g., place a call, send a message, or the like), and user device 210 may output a notification in accordance with the second notification profile (e.g., play a ringtone, or the like).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein may assist a user in locating a user device when the user device has notifications disabled. Implementations described herein may reduce the time and/or quantity of calls needed to locate a user device, thereby conserving processor, memory, and/or battery resources. Further, network resources may be conserved based on the reduced quantity of calls needed to locate a misplaced user device.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A user device, comprising:
one or more processors to:
receive information identifying a first prompt,
the first prompt including text;
receive information identifying a first alert to be provided, when the user device is in a silent mode, based on the first prompt;
receive information identifying a second prompt;
receive information identifying a second alert to be provided based on the second prompt;
receive a first message, including the first prompt, when the user device is in the silent mode,
the first message including the first prompt in a body of text associated with the first message;
detect the first prompt in the body of text associated with the first message;
receive a second message including the second prompt;
detect the second prompt based on receiving the second message; and
provide the first alert and the second alert based on detecting the first prompt and the second prompt,
providing the first alert and the second alert causing the silent mode to be overridden.

2. The user device of claim 1,
where the one or more processors are further to:
detect a volume level within a vicinity of the user device;
determine that the volume level satisfies a threshold; and
where the one or more processors, when providing the first alert and the second alert, are to:
provide flail the second alert based on determining that the volume level satisfies the threshold,
the second alert being different from the first alert.

3. The user device of claim 1,
where the one or more processors are further to:
detect a light level within a vicinity of the user device;
determine that the light level satisfies a threshold; and
where the one or more processors, when providing the first alert and the second alert, are to:
provide flail the second alert based on determining that the light level satisfies the threshold,
the second alert being different from the first alert.

4. The user device of claim 1,
where the one or more processors, when providing the first alert and the second alert, are to:
determine that a threshold amount of time has elapsed since providing the first alert; and
provide flail the second alert, after providing the first alert, based on determining that the threshold amount of time has elapsed.

5. The user device of claim 1, where the first alert is audible and the second alert is visual.

6. The user device of claim 1, where the one or more processors are further to:
determine that a peripheral device is connected to the user device; and
where the one or more processors, when providing the first alert and the second alert, are to:
provide the first alert and the second alert based on determining that the peripheral device is connected to the user device.

7. A non-transitory computer-readable medium storing instructions, the instructions comprising:
one or more instructions that, when executed by one or more processors of a user device, cause the one or more processors to:
receive a first message, including a first prompt, while the user device is in a silent mode,
the first message including the first prompt in a body of the first message;
detect the first prompt in the body of the first message;
receive information identifying a second prompt;
receive information identifying a second alert to be provided based on the second prompt;
receive a second message including the second prompt;
detect the second prompt based on receiving the second message; and
provide a first alert and the second alert based on detecting the first prompt and the second prompt,
providing the first alert and the second alert causing the silent mode to be overridden.

8. The non-transitory computer-readable medium of claim 7,
where the one or more instructions, when executed by the one or more processors, further cause the one or more processors to:

detect a volume level within a vicinity of the user device;
determine that the volume level satisfies a threshold; and
where the one or more instructions, that cause the one or more processors to provide the first alert and the second alert, cause the one or more processors to:
provide flail the second alert based on determining that the volume level satisfies the threshold,
the second alert being different from the first alert.

9. The non-transitory computer-readable medium of claim 7,
where the one or more instructions, when executed by the one or more processors, further cause the one or more processors to:
detect a light level within a vicinity of the user device;
determine that the light level satisfies a threshold; and
where the one or more instructions, that cause the one or more processors to provide the first alert and the second alert, cause the one or more processors to:
provide flail the second alert based on determining that the light level satisfies the threshold,
the second alert being different from the first alert.

10. The non-transitory computer-readable medium of claim 7,
where the one or more instructions, that cause the one or more processors to provide the first alert and the second alert, cause the one or more processors to:
determine that a threshold amount of time has elapsed since providing the first alert; and
provide flail the second alert based on determining that the threshold amount of time has elapsed.

11. The non-transitory computer-readable medium of claim 7, where the one or more instructions, when executed by the one or more processors, further cause the one or more processors to:
receive information identifying the first prompt based on a user input,
where the first prompt includes text.

12. The non-transitory computer-readable medium of claim 7, where the first alert is audible, and
where the one or more instructions, when executed by the one or more processors, further cause the one or more processors to:
receive user input specifying a volume level of the first alert; and
where the one or more instructions, that cause the one or more processors to provide the first alert and the second alert, cause the one or more processors to:
provide the first alert at the volume level.

13. The non-transitory computer-readable medium of claim 7, where the first alert is audible and the second alert is visual.

14. A method, comprising:
entering, by a user device, a silent mode in which alerts are disabled for the user device;
receiving, by the user device, a first message including a first prompt while the user device is in the silent mode,
the first message including the first prompt in a body of the first message, and
the first prompt including text;
identifying, by the user device, a first alert to be provided based on receiving the first message including the first prompt;
receiving, by the user device, information identifying a second prompt;
receiving, by the user device, information identifying a second alert to be provided based on the second prompt;
receiving, by the user device, a second message including the second prompt;
detecting, by the user device, the second prompt based on receiving the second message; and
providing, by the user device, the first alert and the second alert based on detecting the first prompt and the second prompt,
providing the first alert and the second alert causing the silent mode to be overridden.

15. The method of claim 14, where causing the silent mode to be overridden comprises:
switching from a first notification profile to a second notification profile,
the first notification profile disabling alerts for the user device,
the second notification profile enabling alerts for the user device; and
where providing the first alert and the second alert comprises:
providing the first alert and the second alert based on switching from the first notification profile to the second notification profile.

16. The method of claim 14, where causing the silent mode to be overridden comprises:
changing a setting of the user device based on receiving the first message including the first prompt,
the setting relating to the silent mode; and
where providing the first alert and the second alert comprises:
providing the first alert and the second alert based on changing the setting of the user device.

17. The method of claim 14, where providing the first alert and the second alert comprises:
providing an audible alert by playing an audio file; and
providing a visual alert by running an application,
the application activating a light emitting diode associated with the user device.

18. The method of claim 14, where the first message includes the text of the first prompt and additional text.

19. The method of claim 14, where the first alert is audible and the second alert is visual.

20. The method of claim 14, further comprising:
determining that a peripheral device is connected to the user device; and
where providing the first alert and the second alert comprises:
providing the first alert and the second alert based on determining that the peripheral device is connected to the user device.

* * * * *